Jan. 1, 1963  A. AMBROGI  3,071,369
NESTING-COLLATING MACHINE
Filed July 24, 1958  6 Sheets-Sheet 1

INVENTOR.
ALFRED AMBROGI

BY George Spector

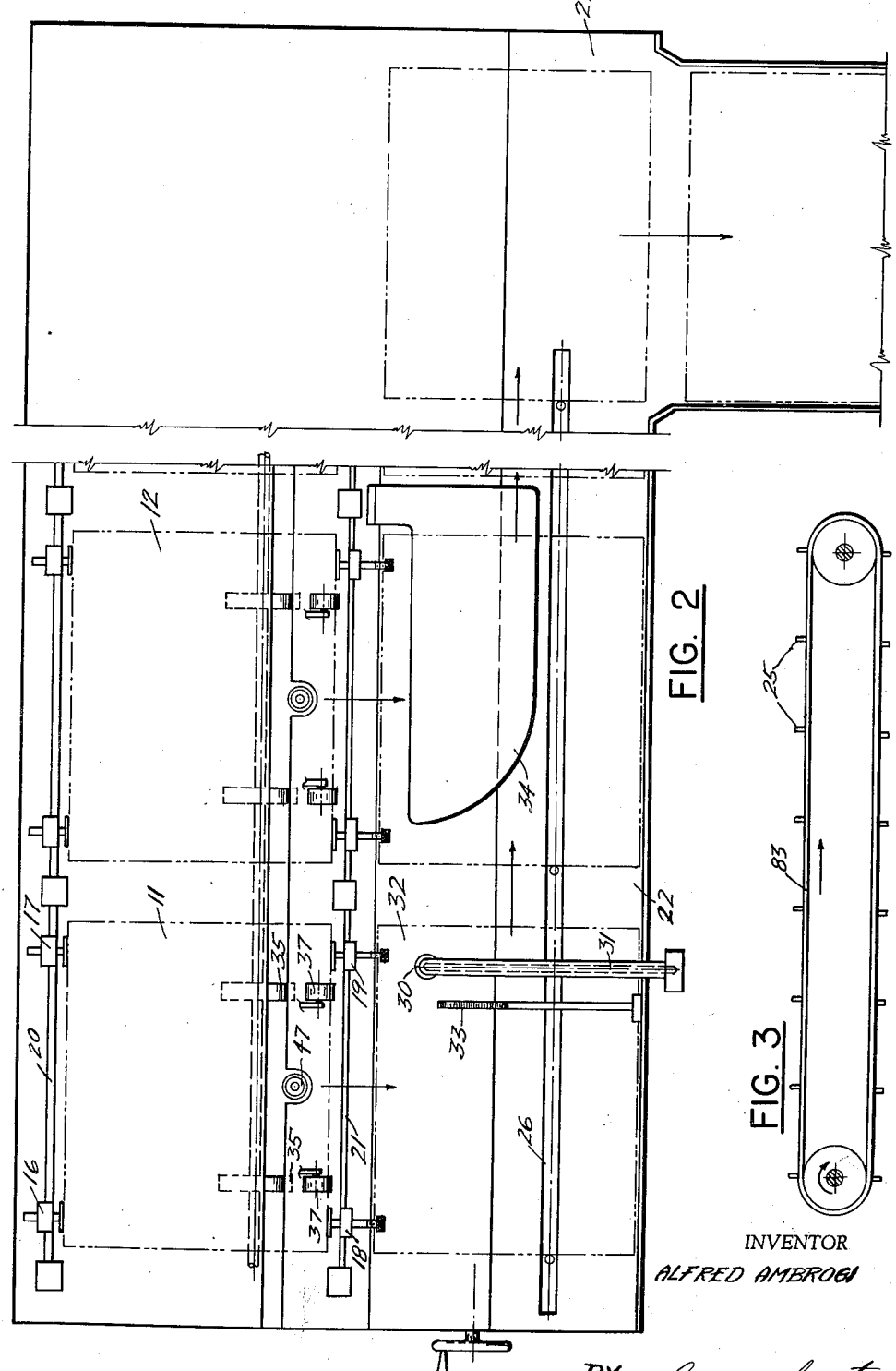

INVENTOR.
ALFRED AMBROG

BY George Spector

Jan. 1, 1963
A. AMBROGI
3,071,369
NESTING-COLLATING MACHINE
Filed July 24, 1958
6 Sheets-Sheet 4
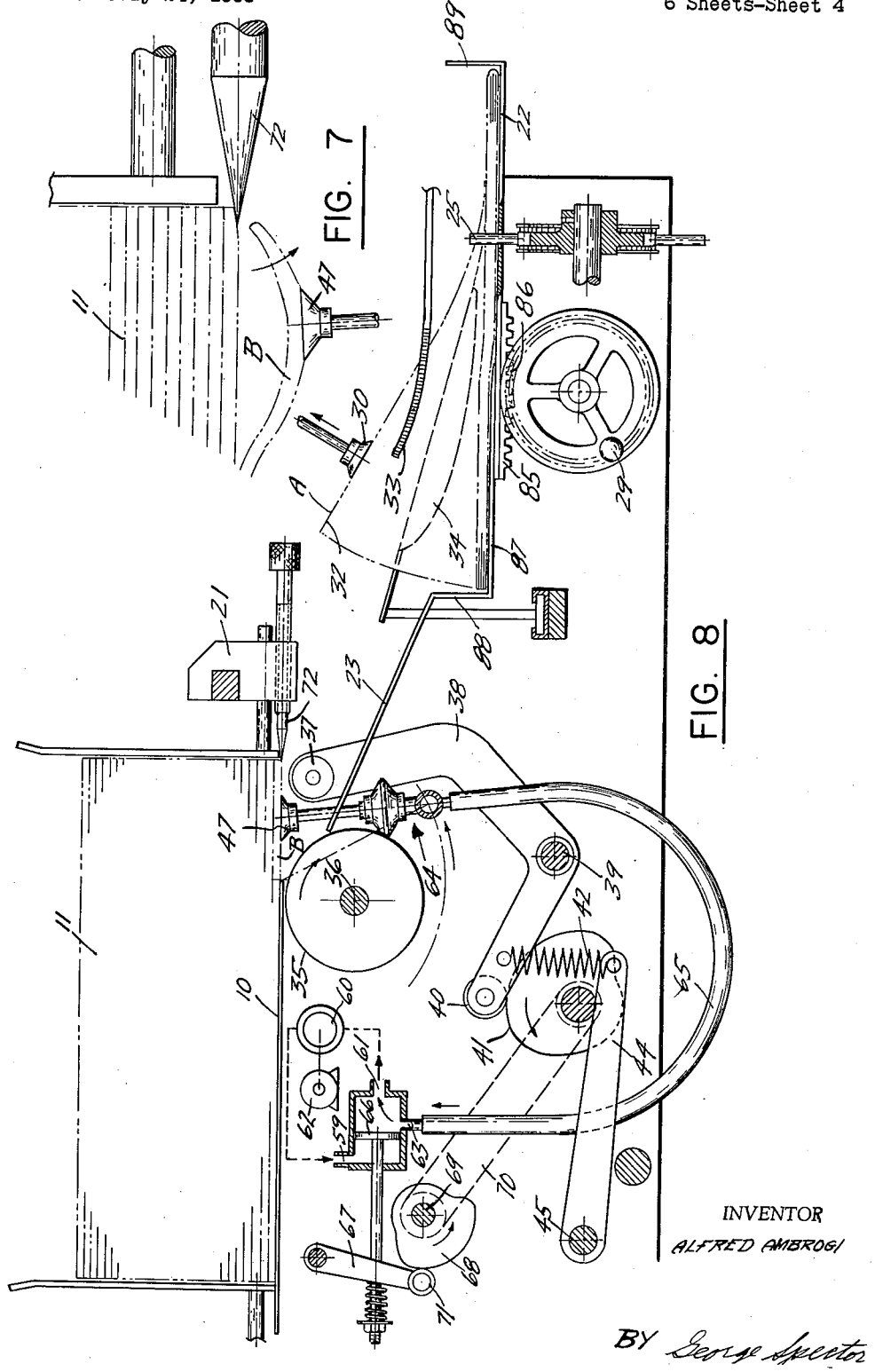
INVENTOR
ALFRED AMBROGI
BY George Speeton

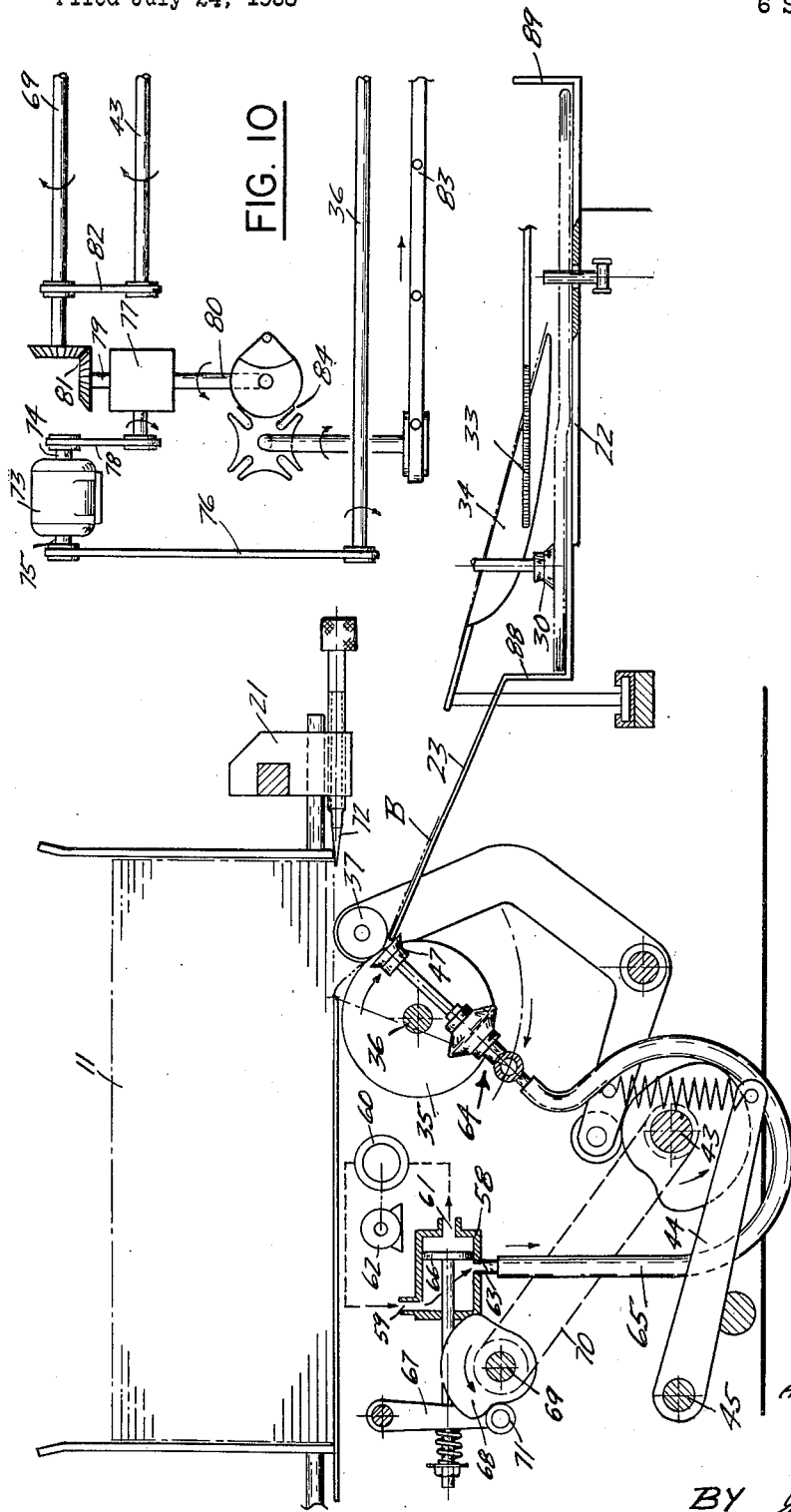

Jan. 1, 1963   A. AMBROGI   3,071,369
NESTING-COLLATING MACHINE
Filed July 24, 1958   6 Sheets-Sheet 6

INVENTOR
ALFRED AMBROGI
BY George Spector

United States Patent Office 3,071,369
Patented Jan. 1, 1963

3,071,369
NESTING-COLLATING MACHINE
Alfred Ambrogi, New York, N.Y., assignor to Capital Business Machines Corporation, East Paterson, N.J., a corporation of New Jersey
Filed July 24, 1958, Ser. No. 750,733
10 Claims. (Cl. 270—55)

This invention relates to improvements in automatic machinery for collating and binding sheets of paper into booklets, magazines, pamphlets and the like, and inserting the same into envelopes bound or unbound.

A principal problem encountered in machinery used to collate or stack sheet material into a desired sequence is the means for selecting one sheet at a time and transporting each sheet to the desired station along a conveyor. The means for selection and transportation must be quick acting and infallible in selecting one sheet at a time. Moreover the device must be adapted to handle sheets of varying conventional sizes by convenient simple adjustments.

A successful solution to this problem is provided by the instant device which can be constructed to handle as many stacks of sheets as is desired. Although the conventional suction method of separating each sheet from each stack is used, the means and manner of applying suction in combination with selection and transporting devices is unconventional and introduces novel improvements in this art.

The sheets are separated from the stack by a plurality of suction cups each cup servicing a stack of sheets. Each cup is moved into engagement with the bottom sheet and then retracted drawing the bottom sheet downwardly away from the stack and into engagement with coacting rollers which transport the sheet to a station on a conveyor. An adjustable needle prevents more than one sheet from being removed from the stack during a cycle of operation. The sheets are disengaged from the suction cup by converting the suction cup into a blower precisely at the time that the sheets contact the rollers.

In addition to providing an efficient collating function this invention will also perform a "nesting" operation which is synchronized with the collating operation. The term nesting as used herein relates to the insertion of a sheet of paper at a specified location between the leaves of a booklet, catalogue etc.

Consequently a general object of this invention is the provision of an automatic device which will rapidly and infallibly stack and bind sheets of papers of varying dimension in a predetermining sequence wherein each of the sheets is transported to a conveyor by synchronized mechanisms employing an improved suction cup type separator that engages the bottom sheet in each stack.

An additional broad object of this invention includes the device described in the preceding object in combination with additional means whereby a sheet or a group of sheets can be inserted at a specific location between the sheets of a booklet or pamphlet in automatic fashion.

The general objects of the invention and additional more specific objects will become more apparent from the following detailed description, claims and attached drawings in which:

FIGURE 2 is a top plan view of the machine showing the various mechanical components.

FIGURE 3 is an elevational view of the conveyor system.

FIGURE 7 is a partial elevation of the selector device showing the operation of the suction cup in relation to the selector.

FIGURE 8 is a sectional elevation of the collating machinery through the centerline of one of the stacks of sheets showing the components in the position wherein the bottom sheet is about to be withdrawn from the stack.

FIGURE 9 is a view similar to FIGURE 8 showing the components in the position wherein the withdrawn sheet is being engaged by the transporting rollers for movement to the conveying and nesting table.

FIGURE 10 is a schematic elevation of the mechanical components illustrating the method of obtaining synchronization.

FIGURES 11-A through 11-F are a series of schematic representations of one form of nesting apparatus showing sequentially the various positions assumed by the nesting components in a complete nesting cycle.

Figure 12:
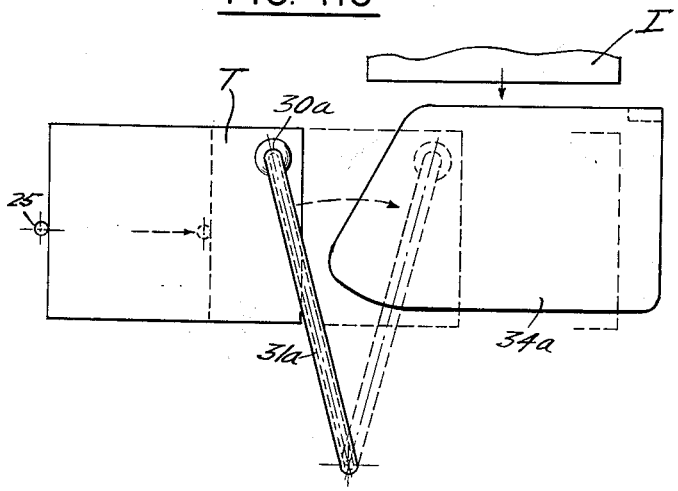

FIGURE 12 is a top plan view of a modified nesting device.

Figure 13:
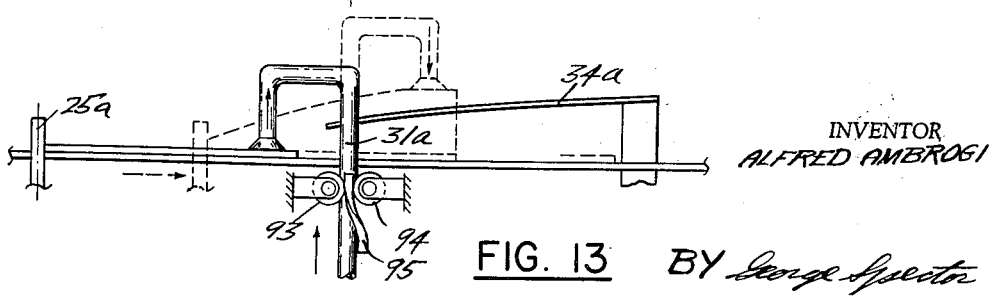

FIGURE 13 is an elevational view of the nesting device of FIGURE 12.

Figure 1:
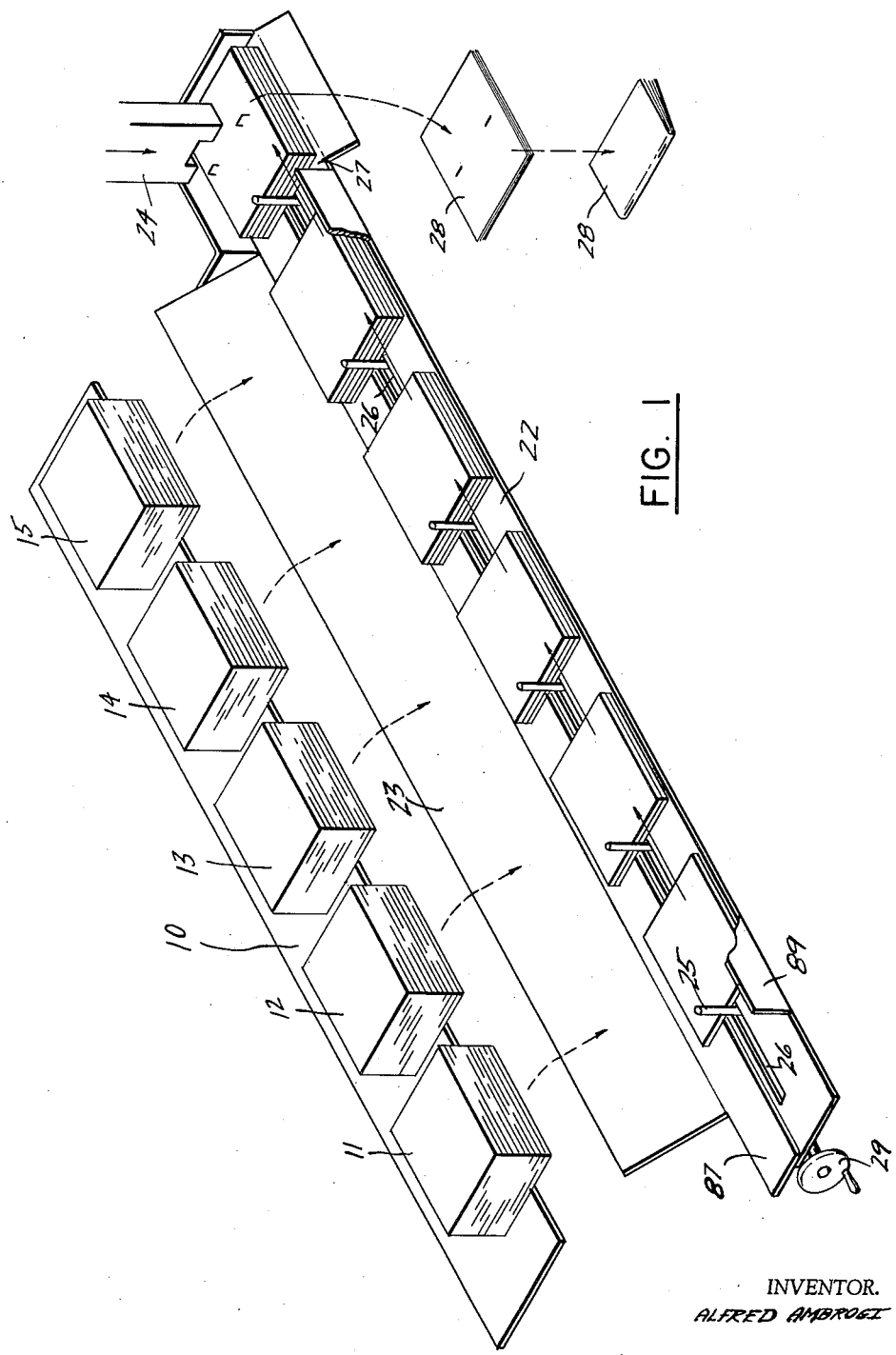
FIGURE 1 is a partial schematic perspective view of the general layout of the machine.

A general understanding of the invention can best be obtained by first referring to FIGURE 1 wherein the visible or superstructure portion of the device is schematically depicted. The machine includes a storage platform 10 subdivided into a plurality of stations adapted to retain a series of sheet stacks 11, 12, 13, 14 and 15. Each stack is aligned and precisely positioned on the platform 10 by sets of adjustable guides 16, 17, 18 and 19 mounted on longitudinally extending brackets 20 and 21, affixed to the platform parallel to and on both sides of the stacks (see in particular FIGURE 2). The portion of the platform which supports bracket 21 is not shown in FIGURE 1 to make clearer the overall movement of the sheets to achieve a collated sequence. The bottom sheets of stacks 11 to 15 are transported to the conveyor table 22 by means of a suction cup and transporting roller device not shown in FIGURE 1 but which will be described in detail in relation to the other figures in the drawing. An inclined slide 23 directs the sheets from the stacks to the conveyor table 22 as shown by the arrows. A conveyor belt (see FIGURE 3) is mounted beneath the table 22 and propels the sheets longitudinally towards a stapler 24 disposed at right angles to the axis of the conveyor belt or to a mechanism where the collated and nested material is inserted into an envelope. At equally spaced intervals the belt is provided with a plurality of pegs 25 that project through a longitudinal slot 26 in table 22 and engage the rear edges of the collated sheets causing the sheets to move forward into alignment with each of the stacks 11, 12, 13, 14 and 15. After receiving the last or top sheet from stack 15, a collated stack is delivered to a stapling or stitching station 27 where a stapler or gang stitcher binds the sheets together. Each booklet 28 thus bound is then ejected from station 27 folded and stored in groups of predetermined number for delivery by conventional apparatus not forming part of this invention and thus not illustrated. It is to be noted, however, that the method of conveying collated groups of sheets at right angles to the movement of each sheet from the stacks 11 to 15 in conjunction with the stapler 24 arranged at right angles to the belt movements results in a stapling operation not requiring a realignment of the collated material prior to stapling. In previous machinery of this class, the collated material is rotated 90 degrees to achieve the proper alignment for stapling. Although FIGURE 1 depicts 5 stacks, it is obvious that the number of stations or stacks can be varied as desired.

The width of table 22 can be varied to accommodate different sized sheets by a gear mechanism operated by handwheel 29. The details of the gear mechanism will be described in connection with FIGURE 8.

The general movements of the machine to effect collation are as follows:

The bottom sheet of stack 11 is ejected (by a device to be described) and directed to the table 22. A peg 25 propels the sheet from stack 11 into alignment with the stack 12 where the conveyor belt momentarily pauses. During the pause a bottom sheet from stack 12 is ejected and deposited on the sheet from stack 11 whereupon peg 25 moves the two sheets forward into alignment with stack 13. The procedure is repeated at each stack until a collated group of sheets is received at stapling station 27. The process is fully automatic and continuous, the only hand adjustment required is to adjust the table width by means of handwheel 29 when a new run is started involving sheets of different dimensions.

Before proceeding with a detailed description of the various mechanical components employed to effect the disclosed general operation of the invention, a brief description of the nesting operation will serve to acquaint the reader with another important general feature of the device.

In the nesting operation, a sheet or bound group of sheets is inserted at a specific location between the sheets of a pamphlet, booklet or the like, delivered to the stapling or binding station, bound and then stored for mailing. The nesting operation is effected in a fully automatic fashion not taught by previous machinery in this class. Referring to FIGURES 2, 8 and 9 in particular, the nesting device comprises a suction cup 30 mounted on a U-shaped arm 31 affixed to a rigid support adjacent table 22. The axis of cup 30 is generally vertically disposed over a corner 32 of the material ejected from stack 11. An index spring finger 33 is positioned above the material ejected from stack 11. Finger 33 is parallel to and adjacent the cup 30; however, cup 30 projects further inwardly towards stack 11 than the finger 33. The material or pamphlet from stack 11 is pinned down resiliently against table 22 by finger 33 permitting only the corner 32 to bend about 33 as a fulcrum. Suction cup 30 is reciprocated by a cam towards and away from corner 32. When suction cup 30 has been brought into engagement with corner 32 of the pamphlet, due to suction, the top page of corner 32 is bent upwardly about finger 33 as a fulcrum. The distance between finger 33 and corner 32 being so related to the location of suction cup 30 and the pressure differential exerted by the cup wherebly only the top sheet of the pamphlet is raised. The precise location of the finger arm to provide the desired effect of permitting the upward movement of only the top sheet is a function of the sheet thickness. Hence the location of the finger 33 is made adjustable with respect to its distance from corner 32. The thicker the sheet the farther will the distance be and, conversely, the thinner the sheet the closer will the distance be. When the cup 30 has raised the top sheet of the pamphlet from stack 11 to a predetermined height, a separator shield 34 is moved longitudinally towards the pamphlet by a synchronized linkage (not shown). Shield 34 passes beneath the top sheet A, FIGURES 11–A through 11–F, and holds the sheet in a position spaced from the remainder of the pamphlet. The shield 34 and the pamphlet so retained are then moved forward to alignment with stack 12 where material from 12 is deposited within the pamphlet under shield 34. The conveyor belt via pegs 25 then propels the pamphlet with the insertion from stack 12 towards the stapler station 27 and out of engagement with shield 34.

The mechanism which deposits the sheets on the conveyor can best be understood by referring first to FIGURE 8 showing a feed or delivery roller 35 positioned just beneath plaform 10 mounted concentrically about a shaft 36. A pincer roller 37 mounted on a link 38 rotates about a pivot 39. The opposite end of link 38 is provided with a bearing wheel 40 held resiliently in engagement with a cam 41 by means of a spring 42. Cam 41 rotates about a shaft 43 whose rotation is synchronized with the rotation of shaft 36. The other end of spring 42 is connected with an arm 44 which fulcrums about a pin 45. Arm 44 is provided with a cam follower 46 (not shown in FIGURE 8; see FIGURES 4 and 5) that engages cam 41. Thus it is apparent that rotation of shaft 43 will cause cam 41 to engage bearing wheel 40 resulting in the positioning of pincer roller 37 away from delivery roller 35. Continued rotation of shaft 43 results in the conditions depicted in FIGURE 9 wherein the high side of cam 41 now has forced arm 44 (via follower 46) downwardly and away from pivot 39 thereby rotating link 38 towards the delivery roller 35 thereby effecting engagement between the delivery roller and pincer roller 37. This engagement traps a sheet B between the rollers; the sheet B having been brought into abuttment with the delivery roller 35 by a suction cup 47 as will be explained, just prior to the engagement of the rollers. As soon as the pincer roller traps sheet B against the delivery roller, the suction cup 47 releases the sheet B and the rotation of delivery roller 35 ejects sheet B down slide 23 and finally on the table 22. Continued rotation of synchronized shafts 36 and 43 returns the pincer roller to the position shown in FIGURE 8 under the influence of the high side of cam 41 bearing against bearing wheel 40.

Figure 4:
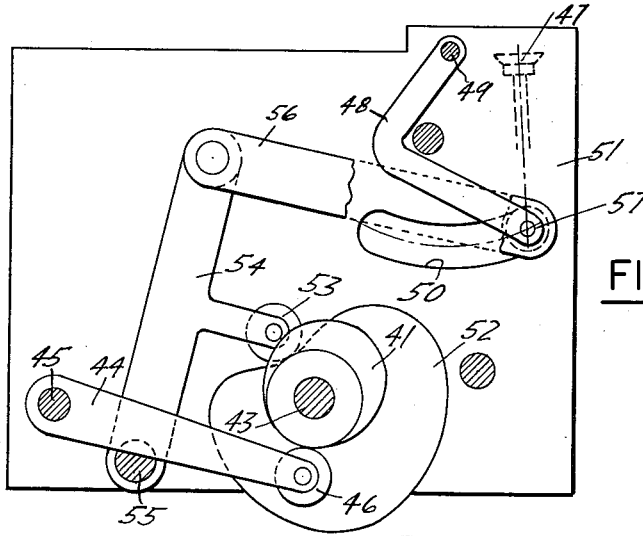
FIGURE 4 is an elevational view of the mechanisms which operate the suction cups and a retractible pincer roller showing the suction cup positioned to engage a sheet of paper.
Figure 5:
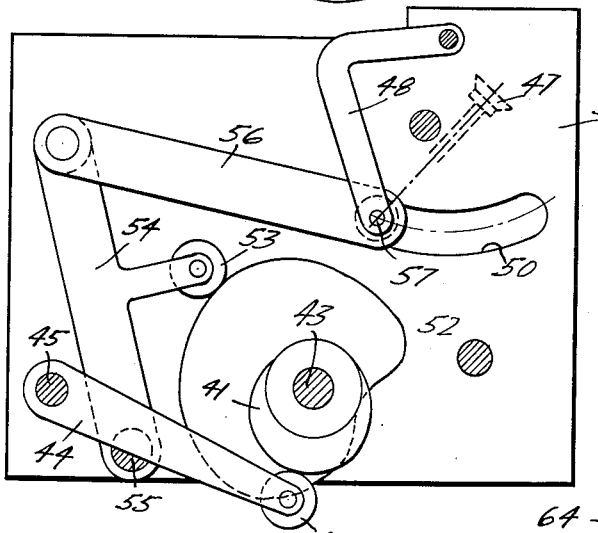
FIGURE 5 is a view similar to FIGURE 4 showing the suction cup retracted to the position wherein the sheet of paper is brought into contact with the transporting rollers.
Figure 6:
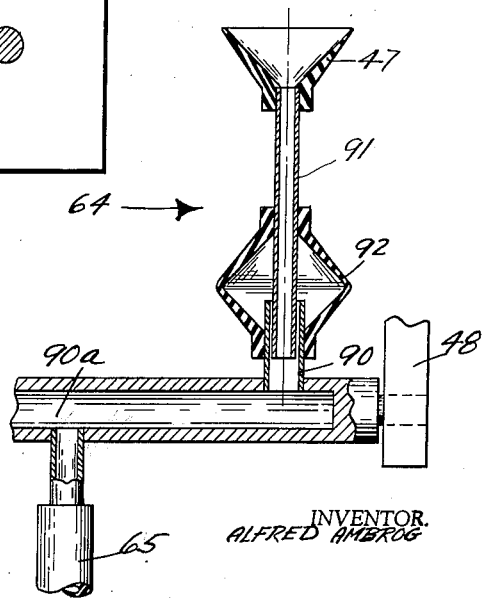
FIGURE 6 is a sectional elevation of the suction cup showing its internal construction.
Figure 11A:
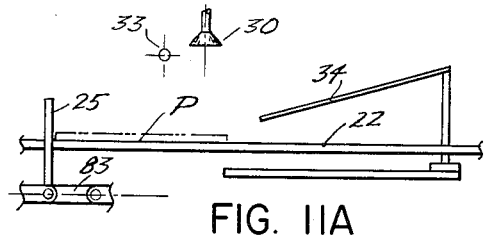
Figure 11D:
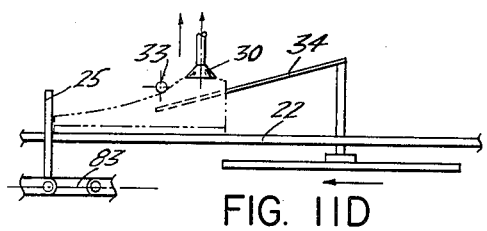
Figure 11B:
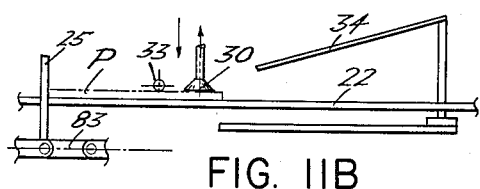
Figure 11E:
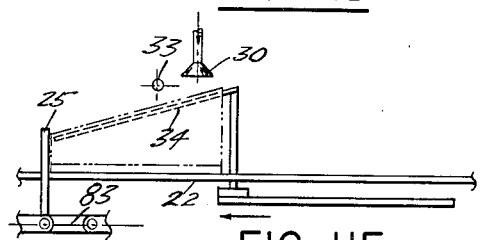
Figure 11C:
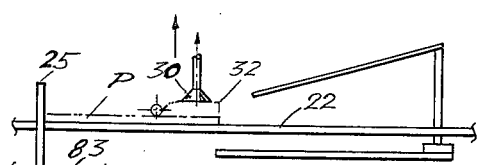
Figure 11F:
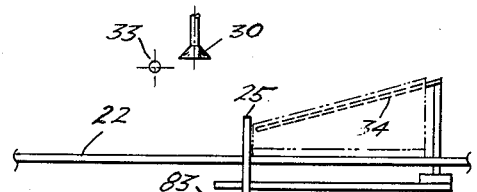

To understand the manner in which the function of each suction cup is synchronized wtih the delivery and pincer rollers refer to FIGURES 4, 5 and 6. Each suction cup assembly is secured to one end of a rocker 48 pivoted about a pin 49. Thus movement of rocker 48 pivoted about pin 49 causes the suction cup 47 to reciprocate from the substantially vertical position of FIGURES 4 and 8 to the angular position shown in FIGURES 5 and 9. These limiting positions are effected by restricting the movement of the free end of the rocker 48 to the arcuate path defined by a guide slot 50 provided in a fixed bracket 51 which also acts as a support for the other shafts and pins. Rocker 48 is actuated by shaft 43 through a cam 52 that bears against a follower 53. A lever 54 which carries follower 53 is pivoted about a pin 55 at one end and connected swivelly to a link 56 at the free end. The free end of rocker 48 is swivelly connected to the other end of link 56 at a joint 57. Thus in FIGURE 4 the low side of cam 52 is in engagement with follower 53 which, through the linkage outlined above, positions the suction cup 47 as depicted by the dotted lines. Continued rotation of shaft 43 results in the condition shown in FIGURE 5 wherein the joint 57 is located at the other end of slot 50 resulting in the inclined disposition of cup 47. Thus the suction cup is reciprocated arcuately from the vertical position of FIGURE 4 to the inclined position of FIGURE 5 as shaft 43 rotates. Since cams 41 and 52 are mounted on the same shaft the relative positions of the pincer roller 37 and the suction cup are synchronized in fixed relative positions. The suction cup position of FIGURE 4 occurs at the same time as pincer roller position of FIGURE 8. In a similar manner the position of the cup in FIGURE 5 is related to the pincer roller position of FIGURE 9.

When the position shown in FIGURE 8 occurs, suctional pressure is exerted by the cups and when the cup is in the position shown in FIGURE 9, the air pressure is reversed and air is expelled through the cup. This reversal of pressure is brought about by a reciprocating valve system comprising a housing 58 having an inlet 59 connected to the pressure side of a pump 60 and an outlet 61 connected to the suction side of pump 60. A motor 62 operates the pump 60. The valve housing 58 also includes a duct 63 connected to the suction cup assembly 64 by means of a flexible conduit 65. Flow of pressure fluid from the valve housing and the placement of the flexible conduit in communication with the suction side of pump 60 is controlled by a reciprocating piston 66. Reciprocation of the piston is effected by a pivoted rod 67 which is maintained in resilient engagement with a cam 68 that is mounted on a shaft 69. Shafts 69 and 43 are interconnected through a belt 70 thereby synchronizing the movements of cams 68, 41 and 52. Since a pressure differential is always imposed on piston 66 by the pump 60, the piston is biased towards outlet 61. Thus when the low side of the cam 68 engages the follower 71 on rod 67 the piston 66 will be forced to the position shown in FIGURE 9, between the duct 63 and outlet 61 wherein the pressure side of pump 60 is connected with the suction cup assembly. When in this position air from pump 60 flows through the suction cup and exerts a pressure on sheet B thereby positively releasing the sheet from the cup permitting the rollers 35 and 37 to eject the sheet down slide 23. Further rotation of shaft 69 causes the high side of cam 68 to force rod 67 to the left in FIGURE 9 resulting in the position shown in FIGURE 8 wherein the piston 66 is located between inlet 59 and duct 63. Pump 60 now creates a suction in conduit 65 and at the suction cup 47 which at the same time has swung over to the vertical position where it engages and becomes attached to the bottom sheet B at the stack.

To prevent more than one sheet from following the movement of the cup 47 an adjustable selector pin 72 is provided in bracket 21. The point of pin 72 extends beneath the stack and permits the removal of only one sheet at a time. The extent to which pin 72 projects beneath the stack depends upon the sheet stiffness. In FIGURE 7 the function of pin 72 is made clearer.

In FIGURE 10, the mechanical arrangement which achieves synchronization of the moving components is schematically depicted. A motor 73 provides rotational energy to the system via opposing duel shafts 74 and 75. Shaft 75 operates the delivery roller shaft 36 via a belt 76. Shaft 74 is connected with a reduction gear box 77 by belt 78. Aligned dual shafts 79 and 80 extend from opposite sides of gear box 77. Shaft 79 through bevelled gears 81, operates the shaft 69 which in turn actuates the valve cam 68. The main cam shaft 43 which controls movements of suction cups 47, 30 and the pincer roller 37 is interconnected with the valve operating shaft 69 through a belt 82. In addition shaft 43 also controls the movement of the nesting suction cups 30 through suitable cam linkages.

The nesting suction cups 30 are interconnected with a valve housing and pump similar to the system used for cups 47. The valve system for the nesting cups 30 is controlled by a cam shaft arrangement tied in with shaft 43 as valve shaft 69 is related to shaft 43. The valve and shaft system for the nesting cup operation is not shown for purposes of clarity in the drawings.

The other shaft 80 which is operated by gear box 77 imparts intermittent movement to the conveyor belt 83 by means of a Geneva cam system 84. The movement effected by the Geneva system has a slow initial acceleration which gradually increases then decreases to a momentary stop. Thus each peg 25 starts from zero velocity gradually accelerate to a maximum velocity and then decelerates to zero velocity. During the brief period of stoppage, a sheet is expelled onto the collated stacks moving along the conveyor table.

In FIGURE 8 the mechanism for adjusting the width of table 22 is seen to comprise a rack 85 affixed to the bottom of table 22. A coacting gear ring 86 is actuated by hand wheel 29 to reciprocate table 22 laterally relative to a fixed pan 87 which is integral with slide 23. Pan 87 and table 22 include lingitudinal side walls 88 and 89 respectively which guide and retain the conveyed sheets in their proper alignment.

Sucion cup assemblies as shown in greater detail in FIGURE 6, each comprise a rigid tubular fitting mounted on and in communication with a common header 90a which in turn is fluidly connected with the conduit 65 leading to the valve housing 58. A rigid pipe 91 is loosely fitted in fitting 90 and includes a conventional suction cup 47 affixed to its outer end. A bellows 92 effects a flexible connection between the pipe 91 and the fitting 90 and provides a function extremely pertinent to the successful operation of the invention as will now be disclosed in the following description of a full cycle of operation.

*Operation*

Starting with the machine in the condition shown in FIGURE 8, suction at cup 47 causes the bottom sheet B to adhere to the cup. Further counterclockwise rotation of shaft 43 will cause the high side of cam 52 (see FIGURE 4) to move joint 57 and suction cup assembly downward and away from the stack towards the position shown in FIGURE 9. Immediately after the suction cup adheres to the sheet B, a pressure differential is imposed on the bellows 92 sufficient to cause the bellows to collapse resulting in an accentuated jerking downward movement of cup 47. The contraction of the bellows 92 (FIGURE 6) is made possible by the loose fit between pipe 91 and fitting 90 permits the suction pressure to enter the bellows chamber. However, the clearance is not too large to permit excessive lateral deflection of the pipe 91. The rapid initial retracting movement of the suction cup due to bellows collapse in combination with the arcuate movement caused by cam 52 results in an efficient removal of one sheet from the stack, with the pin 72 also cooperating to prevent more than one sheet from being withdrawn. It is a common experience that to remove a thin sheet from overlying sheets or other objects, the best way to proceed is to jerk the sheet away rapidly; the bellow-suction cup construction achieves this result.

Precisely at the time that cup 47 with the adhering forward portion of sheet B arrive in the position of FIGURE 9, the rotation of shaft 43 has also moved pincer roller 37 to a position wherein sheet B is pinned against the delivery roller 35. Also, simultaneously cam 68 has been advanced to a position wherein piston 66 is permitted to move towards outlet 61 under the influence of air pressure. With piston 66 so positioned, pressure from pump 60 flows through duct 63 and into conduit 65 eventually emerging from cup 47 to aid in detaching sheet B clearly from the suction cup. With sheet B thus free from cup 47 at the exact time that the pincer roller 37 is pinning sheet B against delivery roller 35, the rotary motion of 35 ejects sheet B onto slide 23 where it slides onto the conveyor table and is transported longitudinally by pegs 25. Further rotation of shaft 43 restores the cup 47, roller 37, and piston 66 to the starting position of FIGURE 8 ready for another cycle.

Since the movement of conveyor belt 83 is synchronized with the timing in the deposition of sheets on the table 22, as disclosed in connection with FIGURE 10, it is now apparent how the conveyor belt halts momentarily at the correct time to receive sheets from the various stacks.

The machine is adapted to perform the collating operation without nesting by providing a detachable connection between the cam shaft 43 and the linkages (not shown) which operate the nesting suction cup 30 and shield 34. When the connection is made the nesting operation can be introduced in synchronization with the pure collating movements just described. Referring to FIGURES 11-A to 11-F the coordination of the nesting operation with the collating operation will be made clearer. Assuming a pamphlet P has been deposited on table 22 and it is desired to insert a sheet beneath the top sheet of P. The nesting equipment is connected with shaft 43 by an external lever (not shown). Suction cup 30 and finger 33 thru intercam action, are caused to descend to the position of FIGURE 11-B, suction being applied at cup 30 when P is contacted. Then cup 30 rises bending a corner 32 of the top sheet of P about 33 as a fulcrum thereby preventing more than one sheet from being lifted. Further lifting of cup 30 deflects finger 33 also as shown in 11-D whereupon shield 34 is slid longitudinally towards the pamphlet and enters under the top sheet. In FIGURE 11-E, the shield fully supports the top sheet and both pegs 25 and shield 34 move to the right holding the pamphlet open until it is in alignment with the stack which is to deposit the insertion. Upon the insertion being deposited, the peg 25 moves the nested pamphlet beyond shield 34 where it closes and finally proceeds to the stapler 24, or to a mechanism where the collated and nested material is inserted into an envelope.

In FIGURES 12 and 13 a modification of the nesting operation is shown wherein a suction cup 30-a is mounted on a U-shaped pipe which is reciprocated vertically along the vertical pipe axis by means of a cam connection with shaft 43. A pair of fixed cam followers 93 and 94 coact with a spiral gear 95 affixed to pipe 31-a whereby the vertical motion of the pipe is partially transformed into rotary motion causing cup 30-a to swing from right to left alternately as shown in the FIGURES 12 and 13. Thus to nest 30-a is swung over by the cam followers 93 and 94 to adhere to the top sheet T and the movement of 30-a to the dotted position causes the top sheet T to pass over a fixed shield 34-a. Peg 25-a moves the pamphlet to the dotted position in alignment with an insert sheet I ejected from a predetermined stack along the conveyor table.

Thus in addition to novelly combining in synchronized fashion the functions of collation and nesting, an improved device to accomplish pure collation is provided by the hereinabove disclosed invention. The sheets from each stack are removed from the bottom. (As opposed to conventional machines which remove from the top of each stack.) Bottom removal permits the introduction of the more rapid acting and accurate devices utilized herein. For example, the synchronized cam shafts, valve shaft, gears, etc. described are all assembled in the machine interior with only the suction cups and pincer rollers protruding. Sheets are always removed from the same elevation, greatly amplifying the mechanization. The bellows action at the suction cup results in a quick clean removal of the bottom sheet without disturbing the remaining sheets. Reversing air pressure at the suction cup releases the sheets at exactly the instant the sheets are to be ejected by the delivery roller. All these refinements are extremely pertinent to the successful handling of thin sheets in a collating operation. The innovations provided by the instant invention have resulted in a high speed collation of sheets of all thicknesses not previously accomplished in this field.

The arrangement whereby the binding device (such as stapler 24) is aligned transversely over the longitudinal conveyor axis introduces substantial savings in time. In previous machines it was necessary to turn the collated sheets 90° to be properly aligned with the binder.

Having thus described in detail the nature of this invention, a grant of Letters Patent is requested for the novel features as defined in the following claims:

1. A collator for gathering sheet material in a predetermined order comprising a plurality of supply stations, conveyor means adjacent said stations for carrying the sheet material in one direction past said stations as said material is removed from each of said stations, feeding means beneath each of said stations, movable suction means for engaging the lowermost one of the sheets in each of said stations and partially removing said lowermost sheets from said supply station, said suction means being provided with resilient bellows means, said bellows means being collapsible when said suction means first engages the lowermost one of said sheets for imparting a rapid withdrawing action to said lowermost sheet for separating said lowermost sheet from the next sheet, roller means movable in timed relation with movement of said suction means for engaging the upper surface of each of said lowermost sheets as the same are partially removed from said supply stations by said suction means and moving said lowermost sheets into engagement with said feeding means, said suction means comprising a vacuum cup mounted for movement from an upper position in the space between the feeding means and the roller means in engagement with the lowermost sheet on a station to a lower position so that the vacuum cup is positioned out of the path of movement of the roller means toward the said feeding means, cam means for moving said movable roller means away from said feeding means, resilient means for moving said movable roller means in the opposite direction toward said feeding means, said roller means being held away from said feeding means against the urging of said resilient means by said lowermost sheet when said lowermost sheet is between said feeding means and said movable roller means whereby said movable roller means can accommodate sheets or groups of sheets of varying thickness as they are removed from said stations, said feeding means and said roller means completing the removal of each of said lowermost sheets from said supply stations and moving said sheets onto said conveyor means, and means for operating said suction means and said movable roller means in timed relation with said conveyor means, said conveyor means being stationary when said sheets are being moved into position thereof.

2. A collator for gathering sheet material in a predetermined order comprising a plurality of supply stations, conveyor means adjacent said stations for carrying the sheet material in one direction past said stations as said material is removed from each of said stations, feeding means beneath each of said stations, a movable first suction means comprising a vacuum cup for engaging the lowermost one of the sheets in each of said stations and partially removing said lowermost sheets from said supply stations, said first suction means being provided with resilient bellows means for supporting said vacuum cup, said bellows means being collapsible when said first suction means first engages the lowermost one of said sheets for imparting a rapid withdrawing action to said lowermost sheet for separating said lowermost sheet from the next sheet, roller means movable in timed relation with movement of said first suction means for engaging the upper surface of each of said lowermost sheets as the same are partially removed from said supply stations by said first suction means and moving said lowermost sheets into engagement with said feeding means, a second suction means movable toward and away from said conveyor means for lifiting a portion of the sheet material thereon, plate means spaced above said conveyor means substantially in alignment with one of said stations and adapted to move in a direction opposite to the direction of movement of said conveypr means to engage the undersurface of said sheet material raised by said suction means and thereafter move with said sheet material in the same direction as the direction of movement of said conveyor means to move with said sheet material into alignment with said one of said stations whereby said material removed from said one of said stations will be inserted underneath the sheet material supported by said plate means, said feeding means and said roller means completing the removal of each of said lowermost sheets from said supply stations and moving said sheets onto said conveyor means, means for operating said first suction means and said movable roller means in timed relation with said conveyor means, and means for moving said second suction means in timed relation with said conveyor means, said conveyor means being stationary when said sheets are being moved into position thereon.

3. A collator as specified in claim 2 including cam means for moving said movable roller means away from said feeding means and resilient means for moving said movable roller means in the opposite direction toward said feeding means, said roller means being held away from said feeding means against the urging of said resilient means by said lowermost sheet when said lowermost sheet is between said feeding means and said movable roller means whereby said movable roller means can accommodate sheets or groups of sheets of varying thickness as they are removed from said stations.

4. A collator for gathering sheet material in a predetermined order comprising a plurality of supply stations for the sheets, conveyor means adjacent said stations for carrying the sheet material in one direction past said stations as said material is removed from each of said stations, feeding means beneath each of said stations, a movable first suction means for engaging the lowermost one of the sheets in each of said supply stations and partially removing said lowermost sheets from said supply stations, roller means movable in timed relation with the movement of said first suction means for engaging the upper surface of each of said lowermost sheets as the same are partially removed from said supply stations by said first suction means and moving said lowermost sheets into engagement with said feeding means, said feeding means and said roller means completing the removal of each of said lowermost sheets from each of said supply stations and moving said sheets onto said conveyor means, cam means for moving said movable roller means away from said feeding means, resilient means for moving said movable roller means in the opposite direction toward said feeding means, said roller means being held away from said feeding means against the action of said resilient means by said lowermost sheet when said lowermost sheet is between said feeding means and said movable roller means whereby said movable roller means can accommodate sheets or groups of sheets of varying thickness as they are removed from said stations, a second suction means movable toward and away from said conveyor means for lifting a portion of the sheet material thereon, plate means spaced above said conveyor means substantially in alignment with one of said stations and adapted to move in a direction opposite to the direction of movement of said conveyor means to engage the undersurface of said sheet material raised by said suction means and thereafter move with said sheet material in the same direction as the direction of movement of said conveyor means to move with said sheet material into alignment with said one of said stations whereby said material removed from said one of said stations will be inserted underneath the sheet material supported by said plate means, means for operating said first suction means and said movable roller means in timed relation with said conveyor means, and means for moving said second suction means in timed relation with said conveyor means, said conveyor means being stationary when said sheets are being moved into position thereon.

5. A collator as specified in claim 4 in which said conveyor means is at a lower elevation than the bottom of said supply stations.

6. A collator for gathering sheet material in a predetermined order, comprising a storage platform subdivided into a plurality of stations extending side by side in a longitudinal row and each station comprising a magazine containing a stack of sheets, the base of said magazine having a discharge opening at the forward end thereof; a conveyer disposed substantially parallel to said storage platform, spaced therefrom and having a plurality of stations in a row arranged to receive sheets simultaneously from said magazines to form in the last station of said row a stack of said sheets in a predetermined order; means for driving said conveyer intermittently to bring the conveyer to rest in position for the respective stations on the conveyer to simultaneously receive sheets from the respective magazines and thus form in the row of stations on the conveyer, from the first to the last, a progressively increasing number of sheets, with the last station on the conveyer containing the stack of said sheets in predetermined order; and feed means for each of said magazines, comprising a feed roller positioned just below and close to the discharge opening of said magazine, a pincer roller spaced from the feed roller with its periphery positioned close to said discharge opening, a vacuum cup mounted for movement from an upper position in the said space between the feed roller and the pincer roller and in the said discharge opening in said magazine in engagement with the lowermost sheet therein, to a lower position so that the vacuum cup is positioned below the path of movement between the feed roller and the pincer roller, means for applying vacuum to the vacuum cup to cause it to engage the leading end of said lowermost sheet, and means to actuate said feed roller, said pincer roller and said vacuum means in synchronism to apply vacuum to said vacuum cup to engage the leading end of the lowermost sheet, then move said vacuum cup with the said leading end of the sheet in a generally downward and arcuate direction to cause the said leading end of the sheet to be brought into frictional engagement with the periphery of said feed roller and out of the path of movement of the pincer roller toward the feed roller, to then move the pincer roller into frictional engagement with the leading end of the sheet on the feed roller and to effect feeding of the sheet to the associated station on said conveyer and thereafter return the pincer roller and vacuum cup to their original positions.

7. A collator for gathering sheet material in a predetermined order, comprising a storage platform subdivided into a plurality of stations extending side by side in a longitudinal row and each station comprising a magazine containing a stack of sheets, the base of said magazine having a discharge opening at the forward end thereof; a conveyer disposed substantially parallel to said storage platform, spaced therefrom and having a plurality of stations in a row arranged to receive sheets simultaneously from said magazines to form in the last station of said row a stack of said sheets in a predetermined order, said conveyer being disposed at a lower level than the level of the discharge openings in said magazines; inclined guide means in the space between said magazines and conveyer for guiding the sheets from the magazines on to the related stations on said conveyer; means for driving said conveyer intermittently to bring the conveyer to rest in position before the respective stations on the conveyer to simultaneously receive sheets from the respective magazines and thus form in the row of stations on the conveyer, from the first to the last, a progressively increasing number of sheets, with the last station on the conveyer containing the stack of said sheets in predetermined order; and feed means for each of said magazines, comprising a feed roller positioned just below and close to the discharge opening of said magazine, an arm pivoted intermediate the ends thereof having one end positioned close to said discharge opening and having a cam roller on the other end, a pincer roller spaced from the feed roller with its periphery positioned close to said discharge opening and carried by the first mentioned end of said pivoted arm, a pivoted rocker, linkage mechanism for actuating said pivoted rocker, said linkage mechanism having thereon a cam roller, a vacuum cup mounted on said pivoted rocker for movement from an upper position in the said space between the feed roller and the pincer roller and in the said discharge opening in said magazine in engagement with the lowermost sheet therein, to a lower position so that the vacuum cup is positioned below the path of movement between the feed roller and the pincer roller, a cam shaft, cams on said shaft for actuating the said cam rollers on the arm carrying the pincer roller and on the linkage mechanism for the pivoted rocker carrying the vacuum cup, means for applying vacuum to the vacuum cup to cause it to engage the leading end of said lowermost sheet, and means to actuate said cam shaft, said feed roller and said vacuum means in synchronism to apply vacuum to said vacuum cup to engage the leading end of the lowermost sheet, then move said vacuum cup with the said leading end of the sheet in a generally downward and arcuate direction to cause the said leading end of the sheet to be brought into frictional engagement with the periphery of said feed roller and out of the path of movement of the pincer roller toward the feed roller, to then move the pincer roller into frictional engagement with the leading end of the sheet on the feed roller and to effect feeding of the sheet on to said inclined guide means and thereafter return the pincer roller and vacuum cup to their original positions.

8. A collator as specified in claim 7, in which the means for creating a vacuum comprises a housing having three ports therein, one a vacuum producing port communicating with a source of vacuum, the second, a pressure producing port communicating with a source of pressure, and the third communicating with said vacuum cup, means in said housing for placing said third port in communication with the vacuum producing port and out of communication with the pressure producing port and also for placing said third port in communication with the pressure producing port and out of communication with the vacuum producing port, and means for operating said last mentioned means in synchronism with the actuation of said cam shaft and said feed roller, so that vacuum is applied to the vacuum cup when in engagement with the leading end of the lowermost sheet, and is maintained on said vacuum cup during the movement thereof to bring the leading end of said lowermost sheet into frictional engagement with the periphery of said feed roller and after the pincer roller is brought into feeding relation with said feed roller, said means places the pressure producing port into engagement with the vacuum cup to break the vacuum and positively release the hold of the vacuum cup on to the leading end of said sheet.

9. A collator as specified in claim 7, in which a collapsible bellows supports the vacuum cup, said bellows being in its extended position when the vacuum cup is moved into engagement with the leading end of the lowermost sheet, said bellows being communicably connected with the vacuum applying means, whereby when the vacuum is first applied a vacuum is first produced in the vacuum cup so that the vacuum cup engages and holds the leading end of the lowermost sheet and upon continued application of the vacuum the bellows is collapsed to lower the vacuum cup and move the leading end of the lowermost sheet away from the rest of the stack of sheets in the magazine.

10. A collator as specified in claim 7, in which a second vacuum cup is positioned in association with one of the stations on said conveyer, said second vacuum cup being movable from a position engaging a corner of a sheet in said station, which corner is disposed at the leading end of said sheet in the direction of movement thereof by the conveyer and is adjacent the storage platform, to a higher position to raise the said corner of the sheet, a separator shield is associated with said second vacuum cup for movement in a direction opposite the direction of movement of the conveyer to engage the underside of the sheet, the corner of which has been raised by said vacuum cup, and elevate the surface of said sheet facing the storage platform for the reception of an insert in the space thus provided between the elevated sheet and the sheet therebelow, said separator shield being movable with the group of said sheets on said station to the next station to maintain the topmost sheet in said elevated position to receive therebeneath the sheet fed from the next station on the storage platform.

References Cited in the file of this patent

UNITED STATES PATENTS

| | | |
|---|---|---|
| 1,833,311 | Winkler et al. | Nov. 24, 1931 |
| 2,117,906 | Obermiller | May 17, 1938 |
| 2,149,462 | Oppliger | Mar. 7, 1939 |
| 2,159,987 | Hartmann et al. | May 30, 1939 |
| 2,341,521 | Baker et al. | Feb. 15, 1944 |
| 2,427,839 | Davidson | Sept. 23, 1947 |
| 2,479,060 | Davidson | Aug. 16, 1949 |
| 2,577,261 | Moser | Dec. 4, 1951 |
| 2,686,052 | Winkler et al. | Aug. 10, 1954 |
| 2,709,584 | Kleinberg | May 31, 1955 |
| 2,742,285 | De Back | Apr. 17, 1956 |
| 2,745,665 | Labombarde | May 15, 1956 |